June 25, 1929.  E. A. SPAULDING  1,718,389
AUTOMATIC WATER FEED CONTROL FOR HUMIDIFIERS
Filed March 26, 1928   2 Sheets-Sheet 1
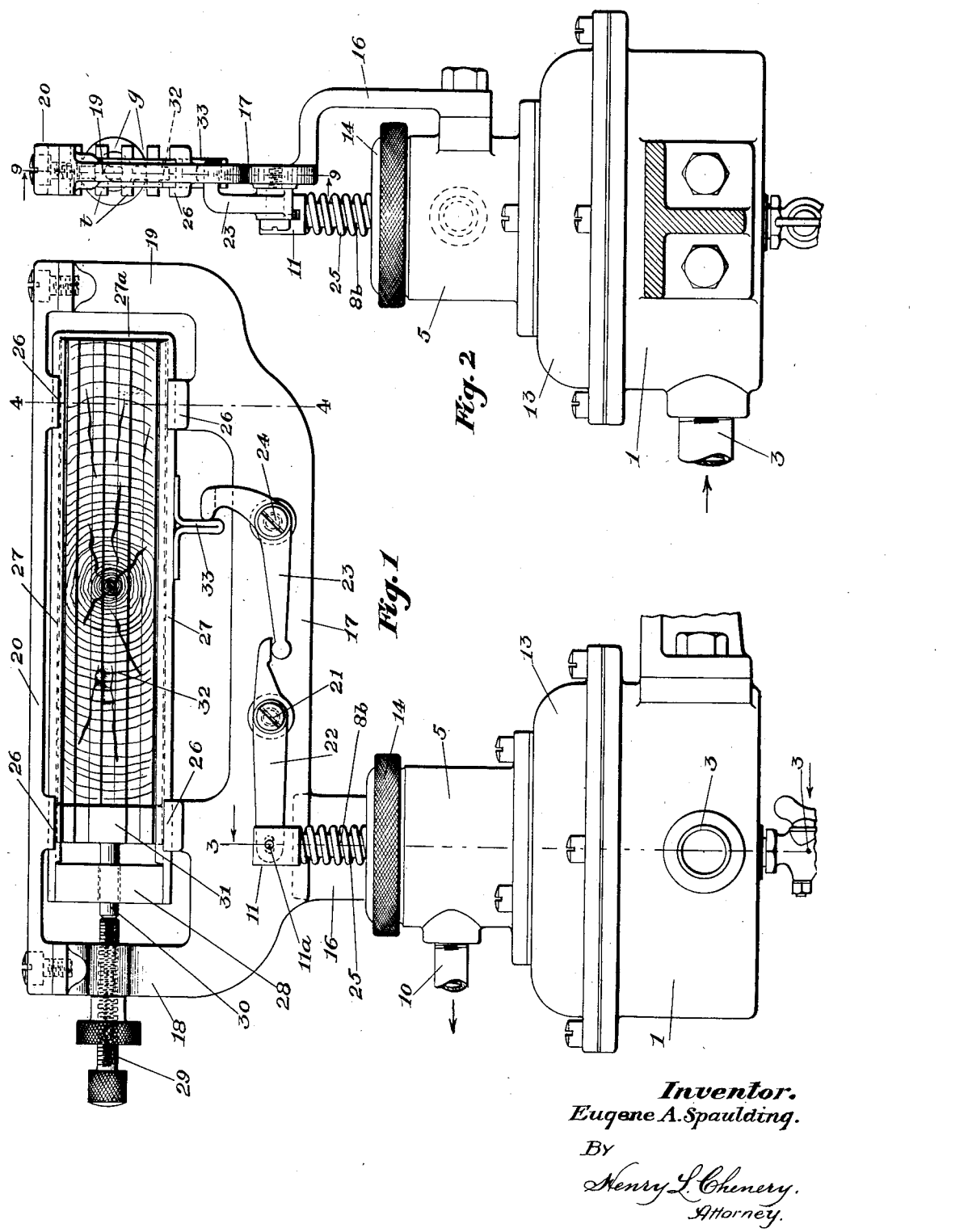
Inventor.
Eugene A. Spaulding.
By
Henry L. Chenery.
Attorney.

June 25, 1929.　　　　E. A. SPAULDING　　　　1,718,389
AUTOMATIC WATER FEED CONTROL FOR HUMIDIFIERS
Filed March 26, 1928　　　2 Sheets-Sheet 2
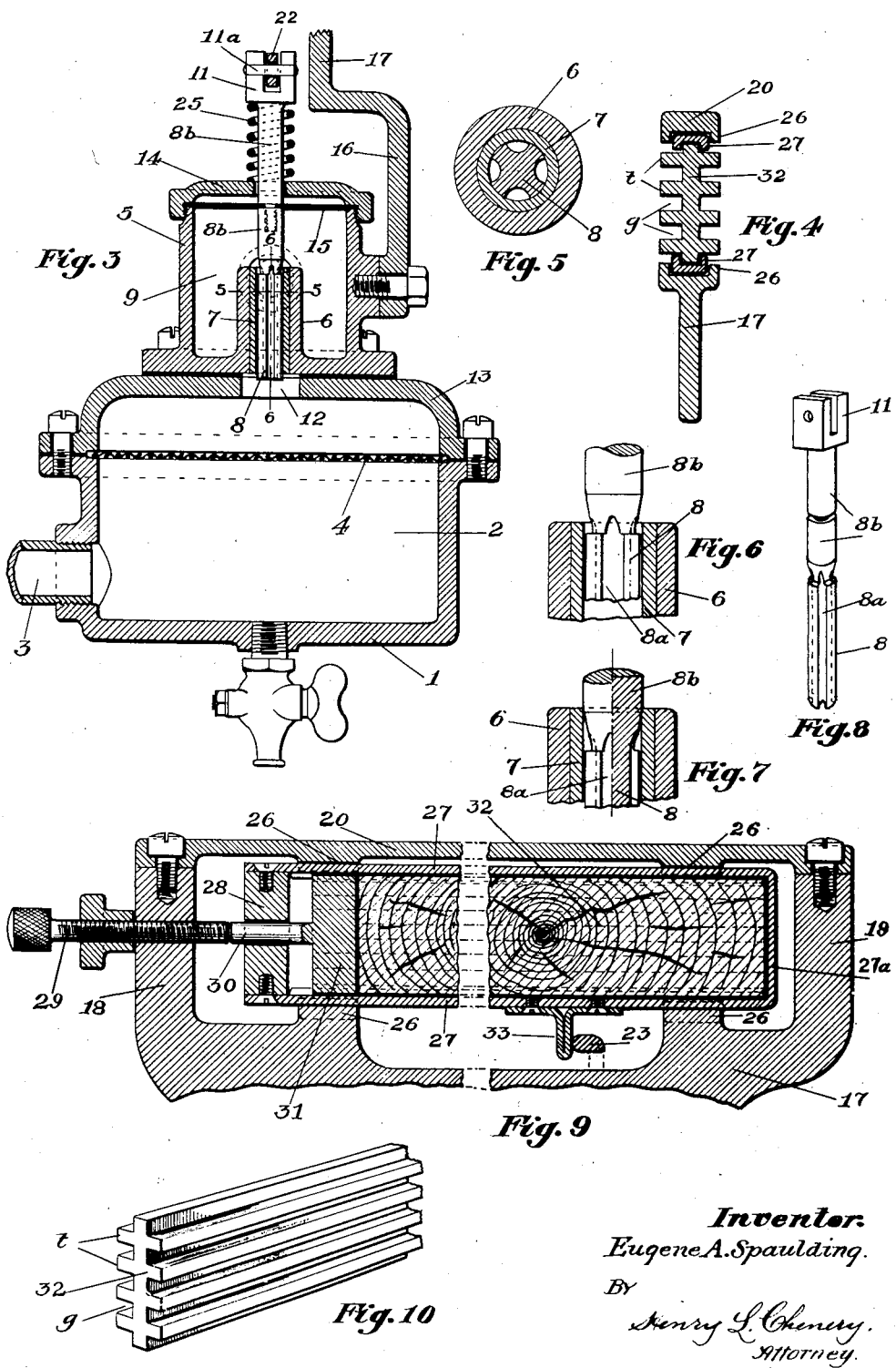
Inventor.
Eugene A. Spaulding.
By
Henry L. Chenery.
Attorney.

Patented June 25, 1929.

1,718,389

UNITED STATES PATENT OFFICE.

EUGENE A. SPAULDING, OF PORTLAND, MAINE.

AUTOMATIC WATER-FEED CONTROL FOR HUMIDIFIERS.

Application filed March 26, 1928. Serial No. 264,807.

In artificially humidifying enclosed spaces it is quite essential that an even distribution of the humidifying medium be made to and throughout every portion of the room, rather than to concentrate or localize the moisture in certain portions thereof.

To procure the most satisfactory results the humidifying medium should be conveyed to the vaporizing apparatus in a constant and continuous delivery, so that, once the prearranged degree or per cent of humidity of the air in the room has been reached, this condition can be maintained without appreciable fluctuation or change.

My invention deals with apparatus conceived and constructed for the purpose of providing automatic control over the delivery of water to the humidifier in a quantity to suit any particular degree of humidity called for.

A general object sought is the regulation of this delivery whereby so much water only as is necessary to produce and required to maintain the desired degree of moisture in the room shall be passed to the humidifying apparatus, thereby eliminating wastage of this medium.

Another object concerns the characteristic structural design of the hygrometric element by means of which very accurate and close regulation is attained in the actuation of the water-supply valve.

A further object, closely related to the last object mentioned, resides in the particular shape or form of this hygrometric element which gives it an extraordinary capacity for quick and sensitive action in response to slight changes in the humidity of the air in the room,—a feature which permits of a more continuous delivery of a small quantity, rather than an intermittent delivery of a larger body of water to be conveyed to the humidifier.

And a still further object, accomplished through the ability of this device to closely gauge the amount of water in proportion to the specific humidity requirements, is the more nearly complete vaporization effected by the humidifier, preventing flooding of the same and the escape into the room of a considerable quantity of unvaporized water.

I have illustrated my invention in the accompanying drawings in which is disclosed one embodiment which, at the present time, I consider preferable to other possible forms in which the invention might be carried out.

In the drawings,—

Fig. 1 is a side elevation of the control;
Fig. 2 is an end elevation thereof;
Fig. 3 is a transverse sectional elevation of the tanks and valve portion, taken on line 3—3, Fig. 1;
Fig. 4 is a section taken on line 4—4, Fig. 1;
Fig. 5 is a sectional plan, enlarged, taken on line 5—5, Fig. 3;
Fig. 6 is a fragmentary sectional elevation of the valve and bushing, taken on line 6—6, Fig. 3,—the valve being shown partially open and the parts greatly enlarged;
Fig. 7 is the same as Fig. 6, except that the valve is shown fully closed;
Fig. 8 is a perspective view of the valve and spindle;
Fig. 9 is a fragmentary, longitudinal sectional elevation of the frame of the control, including the hygrometric block and immediate connected parts, the section being taken on line 9—9, Fig. 2, and
Fig. 10 is perspective view of a portion of the hygrometric block.

Similar parts are identified by like reference characters.

Referring to the drawings, 1 represents the supply tank into which the water used for humidifying purposes first enters. When the control is operating, the chamber 2 is filled with water under a low gauge pressure,—admission to the chamber being through the pipe 3. As a precautionary measure a strainer 4 may be provided so as to insure clean and grit-free water in the humidifier.

Mounted on the supply tank 1 is the delivery tank 5, extending upwardly from the bottom of which is the valve housing 6, preferably supplied with a bushing 7 within which operates the piston valve 8. The function of this valve is to control the delivery of water from the chamber 2 to the chamber 9, from which latter it is conveyed through the pipe 10 to the humidifier (not shown), which may be of any of the centrifugally actuated types extant, and in conjunction with one of which the control is operating.

The valve as a complete unit comprises (see Fig. 8) the body portion 8 provided with longitudinal flutes 8$^a$ through which the water passes when the valve is in open position. The lower part of the spindle portion, 8ᵇ is of the same diameter as is the valve body and it makes a close slidable fit in the bushing 7. Above the top of the flutes is cut a frusto-conical depression so that a more gradual restriction of the flowage of water as it passes through the valve opening may be had,—when the valve is on the downward or closing stroke. A head 11 surmounts the upper valve spindle portion.

In Fig 6 the valve is shown partially open and in Fig. 7 it is fully closed.

An opening 12 in the head 13 makes communication between the chambers 2 and 9, by way of the valve, possible.

The valve bushing 7 is purposely made relatively long in comparison to its bore so that the valve may more easily be reciprocated without cramping.

To prevent leakage through the valve spindle opening in the head 14, I utilize a conventional method of securing tightness at the joints by employing the flexible diaphragm 15, clamping its margins between the head and the face of the tank 5 and locking the central portion between the two portions of the valve spindle 8ᵇ.

Fixed to the tank 5 is an angular bracket 16, on the upper end of which the integral therewith is the main control frame, composed of a horizantal portion 17 and upright end members 18 and 19, the two latter being joined by the tie-bar 20.

Pivoted to the portion 17, at 21, is a double-arm lever 22, the longer arm of which is connected to the valve spindle head 11, at 11ᵃ, and the shorter arm engageable with the longer of the two arms of the bell-crank 23. The bell-crank is pivotally secured to the frame 17 at 24.

The function of the helical spring 25 is to act in opposition to the force tending to close the valve, any relaxation of the latter being followed up by the spring, so that, to all intents and purposes, a positively connected valve operating mechanism is obtained without the possibility of loss of movement at the connecting joints. While the pressure in the tank 1 assists, greater dependence is placed on the spring 25 to effect the opening of the valve.

Projecting into the interior space in the control frame are U shaped guides 26, reciprocable in which is a movable frame having top and bottom channel members 27 and an end tie-bar 28. An adjusting screw 29 aligns with and abuts on the end of the pintle 30 which is slidable in the tie-bar 28, and integral with the slidable anvil 31.

Interposed between the anvil 31 and the end 27ᵃ of the movable frame is the hygrometric block 32, preferably made of wood but possibly of other material which when subjected to the influence of moisture, expands, and when freed of the moisture, contracts.

The form in which the hygrometric element is constructed materially affects its expansive qualities. In Figs. 4 and 10 I show the shape of this element as it would appear in cross section. It consists of a central web with a plurality of longitudinal ribs or tongues $t$ extending outwardly on each side of the web, making the whole appear as a series of tongues alternating with grooves $g$; and when in position within the movable frame the two edges of the web are disposed in the channel portions 27,—the ribs projecting outside of the frame so as to be exposed to currents of air passing the control.

As there is an important relation existing between the expansion and contraction of this element and the amount of exposed surface upon which the moisture of the air can act, it is obvious that, with the relatively large amount of surface exposure a quicker and more sensitive response to changes in humidity of the air can be expected than would be the case was the element formed of a solid block of the same general outside dimensions.

Secured to the lower channel member 27 is a strut 33 which is so located as to engage the shorter arm of the bell-crank 23, so that, with the intermediate and connecting parts, movement of the hygrometric element may be communicated to the valve.

In practical operation, the control should be located in quite close proximity to the humidifier so that a portion of the air drafted by the humidifier blower may impinge on the striated surfaces of the hygrometric element 32. This air, it should be understood, is of the same quality, with respect to its humidity, as that which enters the blower and not the air immediately after it has made its exit from the humidifying apparatus and heavily laden with moisture. It is air, therefore, which registers a fair average of the humidity in the room.

Assume that the air in the room has not reached the proper degree of humidity. The hygrometric element 32 is in somewhat contracted form, allowing the valve 8 to be at least partially open. As the humidity rises the element 32 expands, the end abutting on the anvil 31 remaining fixed and the opposite end thrusting on the portion 27ᵃ of the movable frame, forcing the latter forwardly and causing the bell-crank 23 and lever 22 to act to close the valve 8, restricting the flowage of water to the humidifier. This results in reducing the moisture content of the air with a consequent contraction of the element 32, and a gradual opening of the valve now takes place.

By observing Fig. 7 it will be seen that when the element 32 acts to close the valve 8, there is an overtravel of the valve, due to the fact that the element 32 continues to expand for a short space of time after the valve has reached the closing point. With my construction no compensating devices are required to take care of this overtravel, as the valve simply moves into the bushing 7 an indefinite amount after closing, and remains in this overtravel position until the humidity drops sufficiently to contract the element 32 and again permit the valve to open.

Provided humidifying apparatus of the highest efficiency is employed in the work, it is quite possible that a complete closing of the valve 8 will not be necessary, for, due to the sensitiveness with which the hygrometric block reacts to slight changes in humidity and the expeditious manner in which it functions to change its length, either to increase or decrease it, the feed of the water to the humidifier may be made in a comparatively small but continuous quantity, largely doing away with one particularly troublesome feature characteristic of most humidating outfits,— that is, long intervals between the water-feeding periods, necessitating the delivery of excessive quantities of water at these periods.

What I claim is:—

1. In apparatus of the character described, comprising in combination a water-supply tank, a water-delivery tank, a non-seating valve adapted to control communication between the interiors of the two said tanks, either to open or close the same, a fixed frame, a reciprocable frame within said fixed frame, a striated, hygrometrically functioning block disposed within said reciprocable frame, means connecting said reciprocable frame and said valve whereby the latter may be moved toward and beyond the closed position of said valve in response to the expansive effort of said hygrometric block, and yielding means adapted to assist in opening said valve.

2. In apparatus of the character described, comprising in combination a water-supply tank, a water-delivery tank, means to conduct water to said supply tank, means to conduct water from said delivery tank, a piston valve controlling communication between the interiors of said tanks and adaptable of continued movement in the same direction after closing the valve passage-way, a fixed frame, a reciprocable frame within said fixed frame, a striated, moisture absorptive block disposed within said reciprocable frame, means whereby the expansion of said block may be made to serve as the impelling force to move said valve toward and beyond its closed position, and yielding means adapted to assist in returning said valve to open position.

3. An automatic water-feed control for humidifiers, comprising in combination a water-supply tank having a chamber therein adapted to hold water under pressure above that of the atmosphere, a water delivery tank, a non-seating piston valve adapted to control admission of water from said supply tank to said delivery tank, a water-absorptive block having a plurality of spaced ribs disposed on its side, longitudinally thereof, means interposed between said block and said valve whereby the latter may be moved in one direction by the expansion of said block, and means to locate said block in various positions in said control whereby said valve may be made to remain open for longer or shorter periods of time.

4. An automatic water-feed control for humidifiers, comprising in combination a fixed frame, a slidable frame within said fixed frame, a striated, hygrometrically responsive block enclosed at its marginal portions only by said slidable frame, said block, in cross section, being characterized by a central partition having a plurality of outstanding ribs disposed longitudinally on each side thereof and constituting a series of longitudinal tongues alternating with grooves, holding means for water under above-atmospheric pressure, a valve operable to release said water under pressure to said humidifier, and intermediate means through which the expansive movement of said block may be transmitted in an amplified degree to move said valve into and beyond its closed position.

5. An automatic water-feed control for humidifiers, comprising in combination a water-supply tank adapted to hold water under above-atmospheric pressure, a water-delivery tank, a valve passage-way interconnecting the interiors of the said tanks, a piston valve slidably operative in the said passage-way and provided with a plurality of flutes on its sides, said flutes terminating in a frusto-conical depression, a spindle of uniform size with said valve integral therewith, a head on said spindle, a hygrometrically expansible block having on its sides a plurality of longitudinally disposed ribs relatively spaced, a slidable frame enclosing the borders only of said block, a fixed frame wherein said slidable frame may reciprocate, a bell-crank pivotally secured to said fixed frame, means on said slidable frame engageable with the short arm of said bell-crank, a two-arm lever pivotally mounted on said fixed frame, the shorter arm thereof adapted to engage the longer arm of said bell-crank and the longer arm making connection with the spindle head of said valve, an anvil, having a pintle thereon, disposed adjacent one end of said hygrometric block, and means to locate said anvil in various positions in and relative to said fixed frame.

In testimony whereof I affix my signature.

EUGENE A. SPAULDING.